(12) United States Patent
Pedrycz et al.

(10) Patent No.: US 11,022,711 B2
(45) Date of Patent: Jun. 1, 2021

(54) CORRECTING ECCENTERING EFFECT IN PULSE-ECHO IMAGING

(71) Applicant: Schlumberger Technology Corporation, Sugar Land, TX (US)

(72) Inventors: Adam Pedrycz, Edmonton (CA); Hiroshi Hori, Kanagawa-ken (JP); Jean-Christophe Auchere, Clamart (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 370 days.

(21) Appl. No.: 16/116,981

(22) Filed: Aug. 30, 2018

(65) Prior Publication Data

US 2020/0072999 A1 Mar. 5, 2020

(51) Int. Cl.
*G01V 1/36* (2006.01)
*G01V 1/34* (2006.01)

(52) U.S. Cl.
CPC .............. *G01V 1/362* (2013.01); *G01V 1/34* (2013.01); *G01V 2210/584* (2013.01); *G01V 2210/588* (2013.01)

(58) Field of Classification Search
CPC .... G01V 1/362; G01V 1/34; G01V 2210/584; G01V 2210/588; E21B 47/107
See application file for complete search history.

(56) References Cited

U.S. PATENT DOCUMENTS

| | | | |
|---|---|---|---|
| 5,130,950 A | 7/1992 | Orban et al. | |
| 5,214,251 A | 5/1993 | Orban et al. | |
| 5,354,956 A | 10/1994 | Orban et al. | |
| RE34,975 E | 6/1995 | Orban et al. | |
| 10,884,151 B2* | 1/2021 | Pedrycz | E21B 47/14 |
| 2017/0115423 A1 | 4/2017 | Hori et al. | |
| 2019/0226323 A1* | 7/2019 | Pedrycz | G01V 1/48 |
| 2019/0345816 A1* | 11/2019 | Auchere | E21B 47/04 |
| 2020/0072999 A1* | 3/2020 | Pedrycz | G01V 1/34 |

FOREIGN PATENT DOCUMENTS

EP 2757391 A2 7/2014

OTHER PUBLICATIONS

Hayman et al., Improved Borehole Imaging by Ultrasonics, SPE-28440-MS, Society of Petroleum Engineers New Orleans, LA, USA, Sep. 25-28, 1994, pp. 977-992.
Hayman et al., Improved Borehole Imaging by Ultrasonics, SPE-28440-PA, published in SPE Production Facilities, Feb. 1998, pp. 5-13.

* cited by examiner

*Primary Examiner* — Daniel Pihulic (57) ABSTRACT

Methods for correcting eccentering effects on echoes detected from ultrasonic pulses emitted by a transducer of a downhole tool. Echo envelope amplitude, azimuth, and location for each echo is utilized to assess echo amplitude sensitivity to geometric and spatial characteristics of the downhole tool within the wellbore. Echo envelope amplitudes are corrected for eccentering effects based on the assessed sensitivity. A visual representation of the corrected echo envelope amplitudes is the generated. Also disclosed herein are tangible, non-transient, computer-readable media comprising instructions executable by a processor to carry out the methods, as well as systems including downhole tools and processing devices operable to carry out the methods.

19 Claims, 8 Drawing Sheets

CORRECTING ECCENTERING EFFECT IN PULSE-ECHO IMAGING

BACKGROUND OF THE DISCLOSURE

Ultrasonic pulse-echo measurements have been used for oil and gas exploration and production. Ultrasonic pulse-echo imaging is a technique to interrogate a wellbore surface for acoustic reflectivity and geometry, by scanning an ultrasonic transducer over a wellbore surface, for example, while a downhole tool is rotating and moving along wellbore axis. Downhole acoustic tools may be utilized, during or after drilling of a wellbore, in order to evaluate various aspects of the wellbore and/or of subterranean formations intersecting the wellbore surface, such as by evaluating amplitudes of ultrasonic pulses traveling from the transducer to the wellbore surface and echoes refracted to a detector corresponding to the transducer. Linking information from these pulse-echoes, if properly interpreted, to spatial characteristics may provide valuable information regarding geologic formations intersecting the wellbore, as well as geometric and textural aspects of the wellbore surface being interrogated. Often a goal of such measurements is to form a map of the wellbore and its geological surroundings.

However, drilling muds can be quite attenuative to acoustic pulses, and ultrasonic measurements may be quite sensitive to even small changes in emission characteristics. For example, eccentering of the downhole tool can cause significant skewing of wellbore surface data probed by pulse-echo methods and may result in artifacts that can mask otherwise useful geological, geomechanical, and/or petrophysical information also probable by pulse-echo measurement techniques. Deconvoluting eccentering echo effects from such other useful information about the wellbore and subterranean structures may be difficult, particularly when pulse-echo sampling efforts result in a rather large amount of data.

Historically, various enhancement techniques have been used to correct for eccentricities in oil and gas exploration situations, including histogram equalization and dynamic correction to equalize high and low contrast areas. Such histogrammatic equalization methods generally cannot effectively account for contrast variations caused by intrinsic formation features and artifacts introduced by dynamic tool motion in a wellbore, particularly in situations where rather large amounts of data are collected and need to be interpreted in real-time.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes collecting data for a period of time by detecting echoes from ultrasonic pulses emitted by a transducer of a downhole tool toward a surface of a wellbore and through drilling mud contained within the wellbore. The method also includes extracting variable information from the collected data, including echo envelope amplitude, azimuth, and location for each echo. The method also includes assessing, utilizing the extracted variable information, sensitivity of the extracted echo envelope amplitudes to geometric and spatial characteristics of the downhole tool within the wellbore. The geometric and spatial characteristics include a standoff between the transducer and the wellbore and an incident angle. Echo envelope amplitudes are corrected for eccentering effects based on the assessed sensitivity, and a visual representation of the corrected echo envelope amplitudes is generated.

The present disclosure also introduces a system including a downhole tool and a processing device. The downhole tool includes an ultrasonic portion including a transducer to emit ultrasonic pulses toward a surface of a wellbore, including through drilling mud contained within the wellbore, and a detector to detect ultrasonic pulse echoes corresponding to the ultrasonic pulses. A processing device stores and/or processes data collected for a period of time by detecting the echoes from the ultrasonic pulses emitted by the downhole tool. The processing device also extracts select variable information related to the detected echoes, including echo envelope amplitude, azimuth, and location corresponding to each detected echo. The processing device also assesses, based on the extracted select variable information, echo envelope amplitude sensitivity to geometric and spatial characteristics of the downhole tool within the wellbore. The geometric and spatial characteristics include a standoff between the transducer and the wellbore and an incident angle. The processing device also corrects the echo envelope amplitudes for eccentering effects based on the sensitivity assessment, and generates a visual representation of corrected echo envelope amplitudes.

The present disclosure also introduces a tangible, non-transient, computer-readable medium including instructions executable by a processor to store and/or process data collected for a period of time by detecting echoes from ultrasonic pulses emitted by a transducer of a downhole tool toward a surface of a wellbore, including through drilling mud contained within the wellbore. The instructions are also executable by the processor to extract select variable information related to the echoes, including envelope amplitude, azimuth, and location corresponding to each detected echo, and to utilize the extracted select variable information to assess echo envelope amplitude sensitivity to geometric and spatial characteristics of the downhole tool within the wellbore. The geometric and spatial characteristics include a standoff between the transducer and the wellbore and an incident angle. The instructions are also executable by the processor to correct echo envelope amplitudes for eccentering effects based on the sensitivity assessment, and to generate a visual representation of corrected echo envelope amplitudes.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

An ultrasonic transducer may be mounted on a downhole tool facing toward a surface (sidewall) of a wellbore. Exciting the transducer can result in an acoustic wave pulse, which may propagate through, and is often at least partially reflected at, wellbore and fluid interfaces. The wave pulses, when reflected, may be detected and received as an echo, attributes of which can provide information regarding acoustic reflectivity and wellbore shape, among other things. Attributes can be mapped into 2-dimensional image of azimuth-depth plane and, if properly interpretable, may be used for geology, geomechanics, and other petrophysical purposes. Amplitude of the echo may change (e.g., reduce) in response to changes in acoustic properties of a wellbore (e.g., acoustic impedance of a subterranean formation in a wellbore), associated texture, and geometric changes. For example, wave travel time may be used to compute standoff (or distance between the transducer and wellbore surface) using acoustic wave propagation speed in well fluid. From standoff and known transducer mounting diameter, wellbore diameter and cross sectional shape can be reconstructed according to one or more aspects of the present disclosure. Although the term "transducer" is used herein, it should be understood that the term "transceiver" is equally applicable and that a "transducer" herein may indicate an assembly of multiple components collectively capable of being excited to emit a wave pulse, of detecting a wave pulse echo, or both. For example, in the context of the present disclosure, a transducer and/or transceiver may be or comprise an emitter, a receiver, or both.

For downhole imaging in an acoustically attenuative drilling mud, the echo (envelope) amplitude can vary (in some cases, quite sensitively) as a function of travel time in drilling mud and incident angle of ultrasonic wave propagation to wellbore surfaces. Eccentering of the downhole tool in a wellbore usually causes an appreciable change in amplitude. Although wireline tools may have centralizers, to position themselves minimizing eccentricity (such as less than 2 cm maximum or less than 1 cm maximum from the wellbore center), certain other tools, such as logging while drilling (LWD) tools, may often be appreciably eccentered (e.g., by at least 1 cm from the center, or by at least 2 cm), resulting in appreciable amplitude changes. These appreciable amplitude changes can be observed by a user via visual 2-D maps of ultrasonic pulse-echo probed formations. Although eccentering corrections herein may be applied in a variety of situations and using a variety of tools, an advantageous use may be in combination with a logging while drilling (LWD) tool and/or for methods including one or more LWD stages.

Conventional image enhancement techniques to correct for eccentricities include histogram equalization and dynamic correction to equalize high and low contrast areas, and/or removal of sinusoidal amplitude variation due to tool rotation eccentered position, such as to facilitate visual interpretation by a user. Such conventional histogrammatic equalization and/or amplitude-base trendline removal methods generally cannot effectively account for contrast variations caused by intrinsic formation features and artifacts introduced by dynamic tool motion in a wellbore, particularly not when complicated by eccentering effects. As a result, the methods, processes, apparatus, and systems according to one or more aspects of the present disclosure may preserve histogram-based equalization and sinusoidal trendline removal as the secondary optional image refinement, perhaps after applying other correction methods, such as measurement-based corrections, to permit enhanced contrast resolution without losing detail associated with intrinsic subterranean formations surrounding the wellbore. Additionally or alternatively, the methods, processes, apparatus, and systems according to one or more aspects of the present disclosure may avoid histogram-based equalization in favor of other (e.g., measurement-based, such as amplitude-based) correction methods to permit enhanced contrast resolution without losing detail associated with intrinsic subterranean formations surrounding the wellbore. Such methods can permit ultrasonic pulse-echo (envelope) amplitude image correction, based on other (measured) attributes (e.g., travel time) associated to amplitude at each data point, using statistical data processing. Such methods can be applied in situ for real-time imaging, or can be stored for (re-)processing and/or evaluation, e.g., at the surface.

Figures 1, 2:
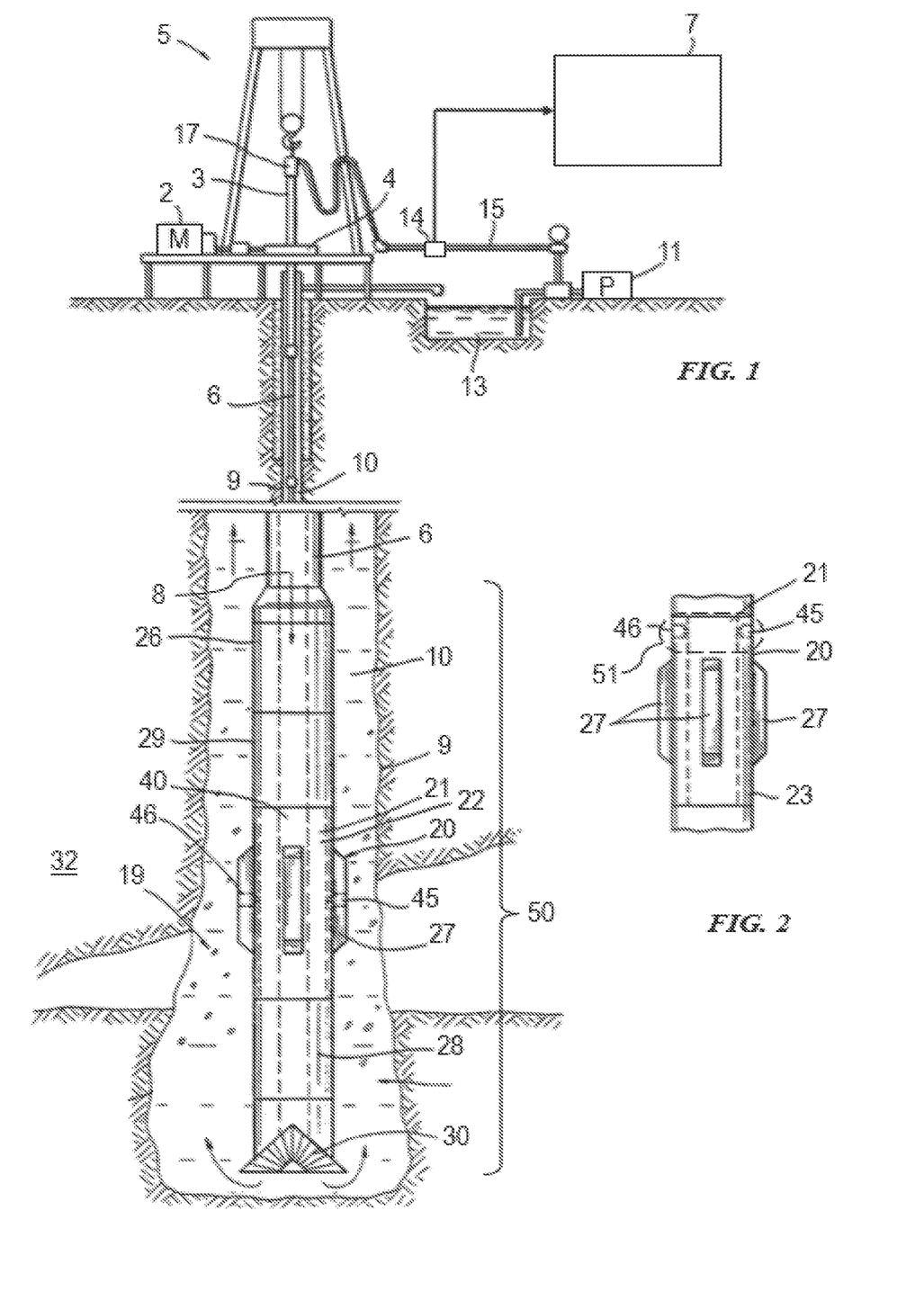
FIG. 1 is a schematic view of at least a portion of an example implementation of apparatus according to one or more aspects of the present disclosure.
FIG. 2 is a schematic view of a portion of another example implementation of the apparatus shown in FIG. 1.

FIG. 1 is a schematic view of at least a portion of an example implementation of a rotary drilling rig system 5 according to one or more aspects of the present disclosure. Downhole measurements can be conducted by instruments disposed in a drill collar 20. Such measurements may be stored in memory apparatus of the downhole instruments, or may be telemetered to the surface via conventional measuring-while-drilling (MWD) telemetering apparatus and techniques. For that purpose, an MWD tool sub, schematically illustrated as a tool 29, may receive signals from instruments of the collar 20, and may transmit them via a mud path 8 of a drill string 6 for receipt, e.g., ultimately via a pressure sensor 14 in a stand pipe 15 and/or to other surface instrumentation 7.

The drilling rig system 5 may include a motor 2 that may turn a kelly 3 through the use of a rotary table 4. The drill string 6 may include sections of drill pipe connected end-to-end to the kelly 3 and may be turned thereby. For example, a plurality of drill collars and/or tools 20, 26, 28, and 29 may be attached to the drilling string 6. Such collars and tools may collectively form a bottom hole assembly (BHA) 50 extending from the drill string 6 to a drilling bit 30.

As the drill string 6 and the BHA 50 turn, the drill bit 30 can bore a wellbore 9. An annulus 10 is thus defined between the outside of the drill string 6 (including the BHA 50) and the wellbore 9 through one or more subterranean geological formations 32.

A pump 11 may pump drilling fluid (drilling "mud") from a source, e.g., from a mud pit 13, via a stand pipe 15, a revolving injector head 17, and the mud path 8 of the kelly 3 and the drill string 6 to the drill bit 30. The mud may lubricate the drill bit 30 and may carry wellbore cuttings upward to the surface via the annulus 10. If desired, the mud may be returned, e.g., to the mud pit 13 or to an appropriate mud regeneration site, where it may be separated from cuttings and the like, degassed, and returned for application again to the drill string 6.

The tool (collar) 20 may be a downhole ultrasonic tool 20 according to one or more aspects of the present disclosure. For example, the ultrasonic tool 20 may include at least one ultrasonic transducer 45, and advantageously also at least a second transducer 46, e.g., placed diametrically opposed from the first, such as for measuring characteristics of the wellbore 9 and/or fluid therein during drilling operations. Such measurements may be conducted while the wellbore 9 is being drilled and/or with the drill string 6 and the BHA 50 in the wellbore 9 while the drill bit 30, the BHA 50, and the drill string 6 are not rotating. Such measurements may be conducted while the drill string 6, the BHA 50, and the drill bit 30 are being tripped to and from the bottom of the wellbore 9. The measurements (or data based at least partially thereon) may be transmitted to the surface via the MWD telemetry tool 29 and the internal mud passage 8 of the drill string 6 (or the annulus 10), or they may be recorded and stored downhole and for retrieval at the surface after the drill string 6 and BHA 50 have been removed from the wellbore 9.

The transducers 45, 46 may be mounted on stabilizer fins 27 of the ultrasonic tool 20, as depicted in FIG. 1, or may be mounted in a cylindrical wall 23 within a transducer mounting section 51 of the ultrasonic tool 20, as depicted in FIG. 2. In implementations in which the transducers 45, 46 are mounted in the cylindrical wall 23, as depicted in FIG. 2, the ultrasonic tool 20 may or may not include the stabilizing fins 27.

An electronics module 22 may contain electronic circuits, microprocessors, memories, and/or the like, operable to control, and/or to receive, process, and/or store data from the transducers 45, 46, which may be mounted on a sleeve, an inner tube, and/or other section 21 secured around or within the collar of the ultrasonic tool 20. The section 21 and other components of the BHA 50 may include a path 40 by which drilling mud may pass through the interior passage 8 of the drill string 6 to the drill bit 30.

The ultrasonic tool 20 may be operable for measuring interior surface structures of the wellbore 9 and optionally also characteristics of the mud flowing upwardly toward the surface via the annulus 10. For example, the mud may contain entrained cuttings, rock chips, and/or gas bubbles (collectively 19), and the ultrasonic tool 20 may be operable for detecting and/or measuring such entrained items 19.

A portion of the drilling rig system 5, such as surface instrumentation 7, may include a data processing system that can encompass one or more, or portions thereof, of the following: control devices and electronics in one or more modules of the BHA 50 (such as a downhole controller), a remote computer system (not shown), communication equipment, and other equipment. The data processing system may include one or more computer systems or devices and/or may be a distributed computer system. For example, collected data or information may be stored, distributed, communicated to a human wellsite operator, and/or processed locally or remotely.

The data processing system may, individually or in combination with other system components, perform the methods and/or processes described below, or portions thereof. For example, such data processing system may include processor capability for collecting data, e.g., related to the amplitude and travel/arrival times of ultrasonic signals transmitted and/or received by the ultrasonic tool 20. Methods and/or processes within the scope of the present disclosure may be implemented by one or more computer programs that run in a processor located, e.g., in one or more modules of the BHA 50 and/or surface equipment of the drilling rig system 5. Such programs may utilize data received from the BHA 50 via mud-pulse telemetry and/or other telemetry means, and/or may transmit control signals to operative elements of the BHA 50. The programs may be stored on a tangible, non-transitory, computer-usable storage medium associated with the one or more processors of the BHA 50 and/or surface equipment, such as surface instrumentation 7, of the drilling rig system 5, or may be stored on an external, tangible, non-transitory, computer-usable storage medium electronically coupled to such processor(s). The storage medium may be one or more known or future-developed storage media, such as a magnetic disk, an optically readable disk, flash memory, or a readable device of another kind, including a remote storage device coupled over a communication link, among other examples.

FIGS. 1 and 2 illustrate schematically that the ultra-sonic transducers 45, 46 can be secured in the collar 20 to face the annulus 10 of the wellbore 9. The transducer(s) can be housed within a protective area of the mounting section 51, such as in individual steel cups or a circumferentially connected transducer support portion, that can be secured within a cavity of the cylindrical wall 23 of the collar 20, as in FIG. 2, and/or within a cavity of the stabilizer fin 27 of the collar 20, as in FIG. 1 (not shown). Alternatively, the transducer could be installed directly into a cavity of the collar 20.

While FIGS. 1 and 2 illustrate an example drilling rig system 5 that can convey a downhole tool/string into a wellbore, other example implementations consistent with the scope of this disclosure may utilize other conveyance means to convey a tool into a wellbore, including coiled tubing, tough logging conditions (TLC), slickline, and others. Additionally, other downhole tools within the scope of the present disclosure may comprise components in a non-modular construction also consistent with the scope of this disclosure.

Other aspects of transducers 45, 46, as well as of apparatus containing them and methods of collecting ultrasonic pulse-echo data regarding the wellbore 9 and/or subterranean geological formations 32, are described, e.g., in U.S. Pat. Nos. 5,130,950, 5,214,251, 5,354,956, RE34,975, and U.S. patent application Ser. No. 15/877,263, filed Jan. 22, 2018, {entitled "Ultrasonic Cutting Detection,"} the contents of each of which are incorporated by reference herein in its entirety.

Figure 3:
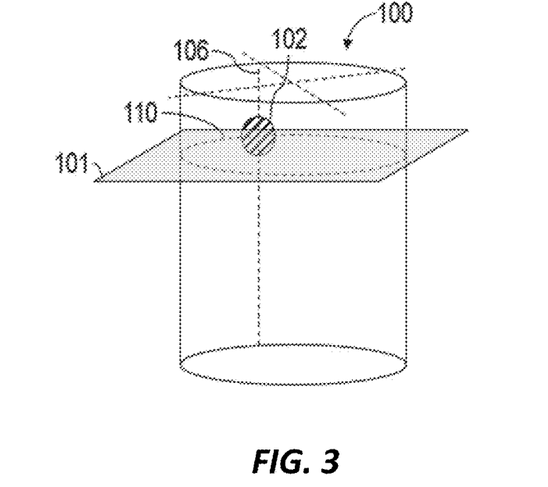
FIG. 3 and FIG. 4 are schematic views of an example implementation of the transducer mounting section shown in FIG. 2.
Figure 4:
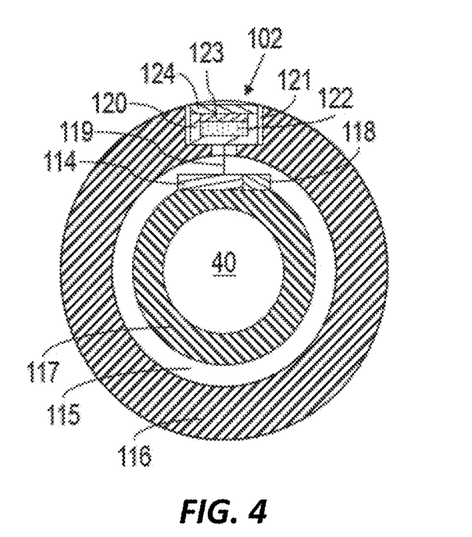

FIG. 3 is a schematic view of an example implementation of the transducer mounting section 51 of the ultrasonic tool 20 shown in FIG. 2, and designated in FIG. 3 as transducer mounting section 100. FIG. 4 is a sectional view of the transducer mounting section 100 taken along a plane 101. The following description refers to FIGS. 3 and 4, collectively.

The transducer mounting section 100 may comprise at least one pulse-echo transducer 102 oriented toward a surface (sidewall) of the wellbore at an azimuth 106 and at an axial location 110. The plane 101 crosses through the axial location 110 and bisects the transducer 102 at azimuth 106. Although FIG. 3 depicts one transducer 102, other implementations within the scope of the present disclosure may include two, three, four, or more than four transducers. If more than one pulse-echo transducer is used, each transducer may be oriented toward the surface of the wellbore at a corresponding azimuth and a corresponding axial location. In such multiple transducer situations, the transducer arrangement can be such that the corresponding azimuths can be different, the corresponding axial locations can be different, or both. Thus, multiple transducers may provide cutting measurements in azimuthally and/or axially distributed positions with respect to the wellbore surface. Multiple transducers, such as mounted in positions on a tool radially offset from each other, may favorably alter acoustic wave propagation speed in well fluid.

Each transducer 102 may be connected to data acquisition and storage electronics 114 (and/or other electronics in the BHA 50) in an electronics section 115 inside a collar 116 of the ultrasonic tool 20. An inner tube 117 (and/or portion of the collar 116) may define the internal mud path 40.

Among other functions, the electronics 114 may provide magnetic orientation at the time of ultrasonic measurements using a magnetometer 118. The transducer 102 shown in FIG. 4 is depicted as a simplified structure of a pulse-echo transducer comprising a metal bulkhead feed through connector 119, a metal housing 120 in an outer recess 121 of the collar 116, a backing 122, a piezo-element 123, and a front-face protective window 124.

Figure 5:
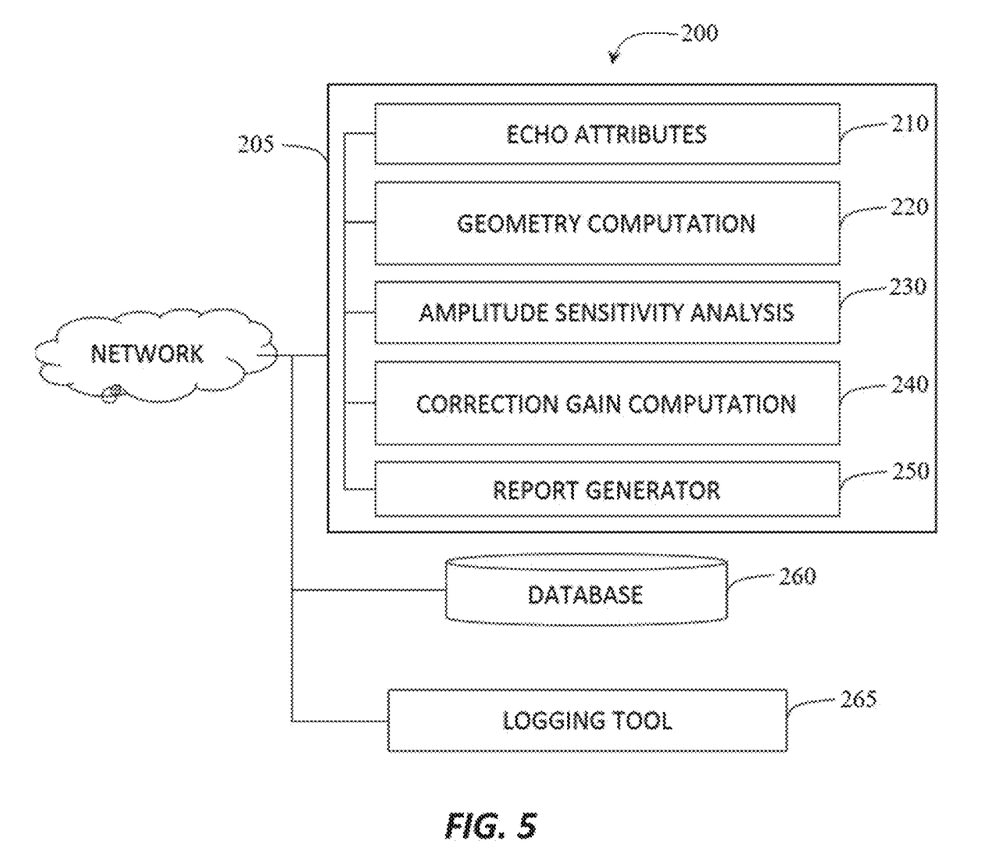
FIG. 5 is a flow-chart diagram of at least a portion of an example implementation of a method according to one or more aspects of the present disclosure.

FIG. 5 is a flow-chart diagram of a data flow 200 representing at least a portion of an example implementation of a method for correcting an ultrasonic pulse-echo amplitude image due to eccentering of a downhole tool, such as the BHA 50 shown in FIGS. 1-2. Measurement and correction of ultrasonic pulse-echo amplitude data for eccentering effects 205 can include modules or stages of collecting and/or assessing pulse-echo attributes 210, calculating eccentering impacts on pulse-echo amplitudes using geometric computation 220, analyzing amplitude sensitivity to geometric and spatial characteristics 230, computing gain correction across all echo amplitudes 240, and generating a visual representation of corrected pulse-echo results 250.

Optionally, data and/or computation involving one or more of these modules or stages can be accessed from and/or transmitted to a database 260, which may be an element of a networked module or may be separate therefrom, and which database 260 (and/or an interconnected network) may house historical information about the current implementation tool/method in different downhole formations and/or about different implementation tools/methods in the current downhole formation. In some situations, the data flow 200 may be sent to a downhole tool, such as an LWD tool on a drill string and/or such as the BHA 50 shown in FIGS. 1-2.

At module or stage 210, ultrasonic pulse-echo data can be collected as raw data, i.e., uncorrected for tool eccentering effects. As shown in FIG. 5, the raw data can be acquired a tool such as ultrasonic tool 20 of FIGS. 1-2 and/or logging tool 265 of FIG. 5 on-the-fly (in situ and/or in real time), can be stored in and/or accessed from the database 260, and/or can be stored and/or accessed via network. The following examples present ultrasonic pulse-echo data acquired by an LWD tool on-the-fly.

Figure 6:
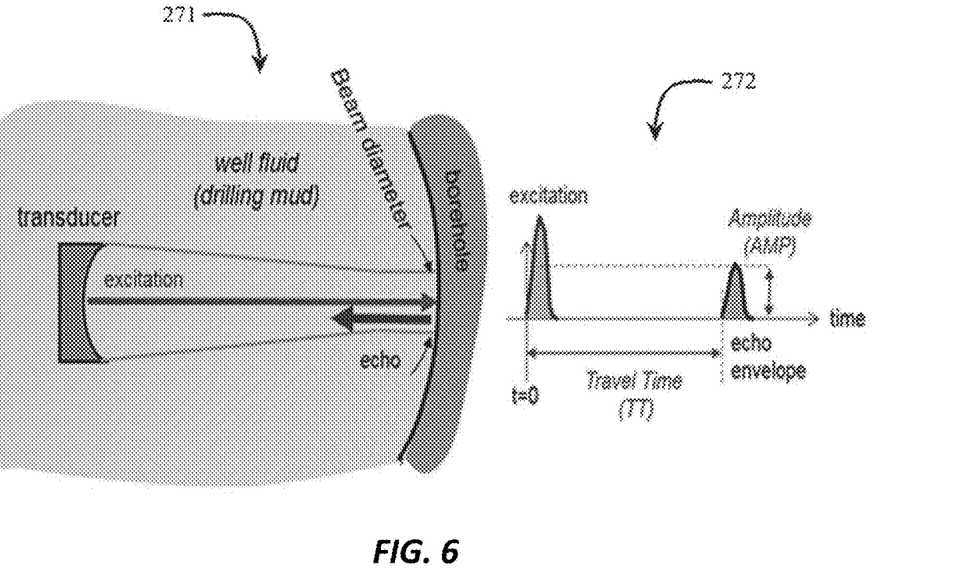
FIG. 6 is an illustration of at least a portion of an example of an ultrasonic pulse-echo measurement method using a downhole tool according to one or more aspects of the present disclosure.

In FIG. 6, ultrasonic pulse-echo measurements are made in an example wellbore (or borehole), a portion of which is pictured in diagram 271, with the transducer operating in pulse-echo or transceiver mode. An excitation causes the transducer to emit toward a wellbore surface an ultrasonic pulse, which is shown to propagate through well fluid (drilling mud) and, e.g., at fluid and/or wellbore interfaces, to reflect back toward the transducer as an echo. The ultrasonic pulse has initial characteristics, such as amplitude, frequency, and the like. A detector (not shown in detail, though it may be part of the transducer, or separate therefrom but close thereto) then receives the echo signal, and a tool acquisition system collects data related to that echo signal. The tool acquisition system may process an echo signal using analog and/or digital circuitry, e.g., via filtering, amplification, and/or applying a Hilbert transformation, along the way to extracting an echo envelope amplitude and travel time for the echo signal, such as pictured in diagram 272 of FIG. 6. Travel time is measured as the difference between the beginning of transducer excitation and the beginning of the echo envelope. Some general ultrasonic pulse-echo signal acquisition and processing details are described, e.g., in two articles, both by A. J. Hayman et al. and both entitled "Improved Borehole Imaging by Ultrasonics"—(i) identified as SPE-28440-MS, published by Society of Petroleum Engineers (SPE), 1994, pp. 977-992; and (ii) identified as SPE-28440-PA, published in SPE Production & Facilities, February 1998, pp. 5-13, the contents of both of which are incorporated herein by reference in their entireties.

Additional attributes of ultrasonic pulse-echo signals, such as frequency, phase angle, and/or the like, may additionally be extracted as a result of echo signal data processing, which may include wavelet transformation and/or model signal fitting. Raw waveforms of echo signals collected in module or stage 210 may be recorded and stored in (downhole) memory, with or without data compression, optionally for post-processing (e.g., at the surface). Using a geometrically focused transducer, properties of the wellbore surface(s) (sidewall(s)) and the subterranean formations through which the wellbore is drilled, as well as optionally of the drilling fluid/mud, can be probed within the beam volume, which has a cross-sectional area represented by a beam diameter. For example, within a wellbore, the beam diameter at imaging frequencies can vary from about 4 millimeters (mm) to about 8 mm, depending on standoff. Other information on additional attributes of ultrasonic pulse-echo signals, aside from travel time and echo (envelope) amplitude, can be found, e.g., in European Patent No. EP 2 757 391, the contents of which are incorporated by reference in their entirety.

Figure 7:
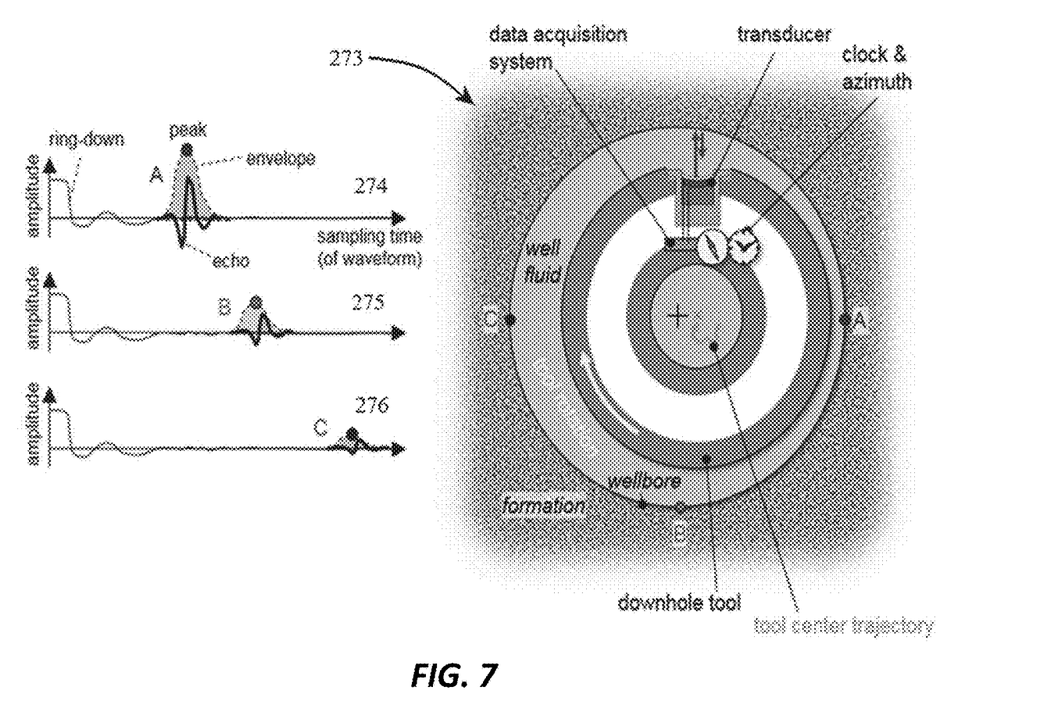
FIG. 7 is an illustration of at least a portion of an example of an ultrasonic pulse-echo measurement method using a downhole tool according to one or more aspects of the present disclosure.

FIG. 7 is an illustration of an example of ultrasonic pulse-echo measurements using a downhole tool, such as an LWD tool on a drill string and/or such as the BHA 50 from FIG. 1. FIG. 7 may be used in accordance with a method for correcting an ultrasonic pulse-echo amplitude image due to eccentering of a downhole tool. Diagram 273 of FIG. 7 is a schematic cross-section view of an example transducer and data acquisition system mounted on an example downhole tool. The tool is shown as being eccentered in wellbore toward a surface (sidewall) of the wellbore. The acquisition system can repeatedly undertake ultrasonic pulse-echo measurements at sufficiently short intervals, e.g., on the order of milliseconds, to acquire an assortment of pulse-echo data. This data acquisition may occur while the downhole tool is rotating and moving along a wellbore axis, which may enable information gathering and/or visual mapping regarding the wellbore surface(s) and/or the subterranean formation(s) surrounding the wellbore. Pulse-echo data may be collected (and/or stored) and associated with time and transducer orientation, such that acquired data can be mapped relative to earth orientation and well location (e.g., depth). Azimuth and location (e.g., depth) information may be used in binning of pulse-echo data, with or without applying statistical data processing.

In FIG. 7, three example pulse-echo waveforms are illustrated in diagrams 274, 275, 276. The waveforms are acquired at three different azimuths from the schematic cross-section in diagram 273 of FIG. 7, which azimuths are indexed as A, B, and C, respectively. Due to standoff increases in respective order, this set of wellbore echo envelopes (shaded in diagrams 274, 275, 276 and bound by dashed lines) show respectively longer delays in waveform sampling time, and indicates reduced amplitude echoes, e.g., which may be due to geometric and/or well fluid attenuation. Drilling fluid or mud can often exhibit relatively large ultrasonic (acoustic) signal attenuation, e.g., about 1 to about 20 decibels per centimeter (dB/cm) of two-way attenuation rate at downhole pulse-echo measurement frequencies ranging from about 100 kilohertz (kHz) to about 700 kHz. At an example imaging frequency near 400 kHz, attenuation may range from about 7 dB/cm to about 15 dB/cm. In such conditions, a several-millimeter standoff change could introduce about 2-3 dB echo amplitude change; such a relative echo amplitude change can be appreciable relative to reflectivity change, which may be determined as a function of ultrasonic (acoustic) impedance of typical subterranean formations (e.g., carbonates, sandstone, shale, or the like) and of drilling muds.

In conventional wireline imaging tools, transducers can often be centralized in the wellbore, so that tool eccentering effects may be minimized. Also, in many LWD caliper measurements, amplitude is often not used or measured. When raw uncorrected pulse-echo data is presented in image form, tool eccentering effects may appear as azimuthal contrast changes. Typical example two-dimensional images acquired by an example downhole tool at centered and eccentered positions of a relatively smooth wellbore (e.g., where eccentering contrast and wellbore and subterranean formation information are presented) are illustrated in diagrams 277, 278 of FIG. 8, respectively. A three-dimensional representation of the two-dimensional images of the wellbore is also shown in diagram 281 of FIG. 8 for context. In the three-dimensional representation, the upward or "U" azimuth is shown roughly in the foreground and the downward or "D" azimuth roughly in the background, with the measurements proceeding as the downhole tool rotates (e.g., clockwise in this case). As a result, the azimuth labelled "R" would roughly correlate to the left side of diagram 281, and the azimuth labelled "L" would roughly correspond to the right side (i.e., R would be located to the right of U and D, and L would be located to the left of U and D, if the wellbore were viewed with U in the background and D in the foreground).

Figure 8:
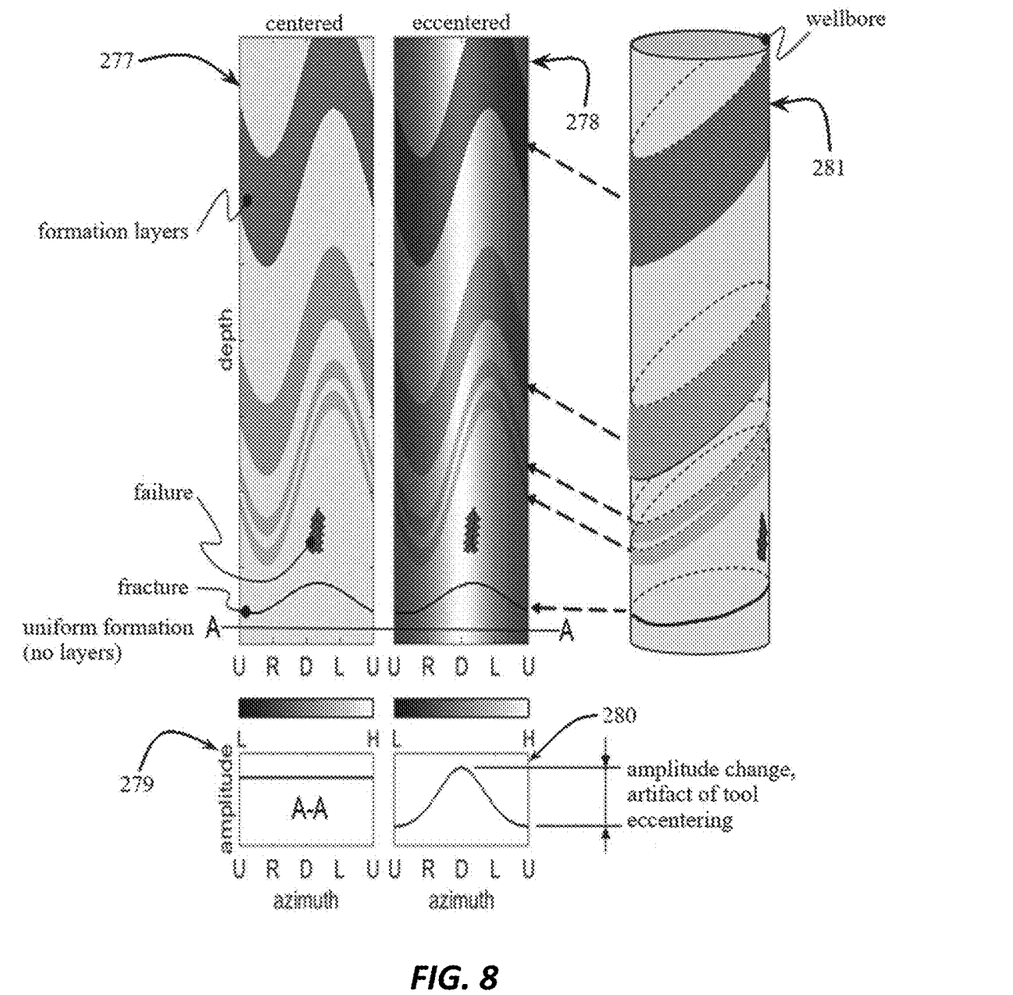
FIG. 8 is an illustration of a visual output of at least a portion of an example implementation of a method according to one or more aspects of the present disclosure.

In FIG. 8, typical subterranean formation layering and dipping shown in diagram 281 appears in the two-dimensional images in diagrams 277, 278 as sinusoidal darker gray areas relative to background (shown in light gray, and representing a relatively higher echo envelope amplitude than do the respective subterranean formations). Wellbore and/or subterranean formation features are not always represented as sinusoidal ribbons in two-dimensional azimuthal images (and thus do not always represent features oriented angularly to the plane of the wellbore cross-section). Indeed, sometimes thin and/or partial circumferential fractures may appear as a thin, relatively dark line, while failures may appear as dark localized sections of various shapes and sizes. For azimuthal images (and, therefore, for pulse-echo measurements) involving relatively complex features and/or an array of contrast variations from those features, it may be difficult or practically impossible to distinguish (or deconvolute) interacting features from each other using simple histogrammatic equalization and/or sinusoidal trend line correction techniques.

In acoustically attenuative well fluid, eccentering effects on echo amplitude images may appear as amplitude reduction, e.g., by variation of standoff that may (in some cases exponentially) alter pulse-echo amplitude, by breadth of incident angle of ultrasonic signals to/from the wellbore surface, and/or by geometric decay of pulse-echo (acoustic) signal pressure. In such complex situations, (conventional) amplitude correction by applying histogram equalization and dynamic correction and/or sinusoidal trend line correction will often not recover or deconvolute formation-dependent amplitude contrast and geometric decay variations in a satisfactory manner.

To illustrate an example pulse-echo amplitude change caused by eccentering of a downhole tool, azimuthal echo (envelope) amplitude profiles are sampled in a location where there are no (or relatively few) appreciable wellbore and/or subterranean formation features. In diagrams 277, 278 of FIG. 8, that is shown to be near the bottom of the two-dimensional azimuthal images, indexed as line A-A. The azimuthal contrast profile along line A-A is correspondingly presented graphically below each two-dimensional image in diagrams 279, 280 of FIG. 8, respectively. In the azimuthal contrast diagram 279, the tool is effectively centered within the wellbore, so that standoff effects appear relatively constant, and echo (envelope) amplitude variations appear relatively negligible, across azimuthal positions. In the azimuthal contrast diagram 280, the tool is effectively eccentered, in this case toward the D azimuth, with standoff thus being respectively shorter and longer, compared to the effectively centered graphic, with respect to the D and U azimuths of the wellbore, respectively. As a result of the eccentering, the echo (envelope) amplitude contrast appears as increased and decreased by relatively shorter and longer traveling path in the attenuative drilling mud, with respect to the D and U azimuths of the wellbore, respectively. Therefore, the echo (envelope) amplitudes appear reduced extending away from the D azimuth and approaching the U azimuth, and the echo contrasts appear axially suppressed.

Figure 9:
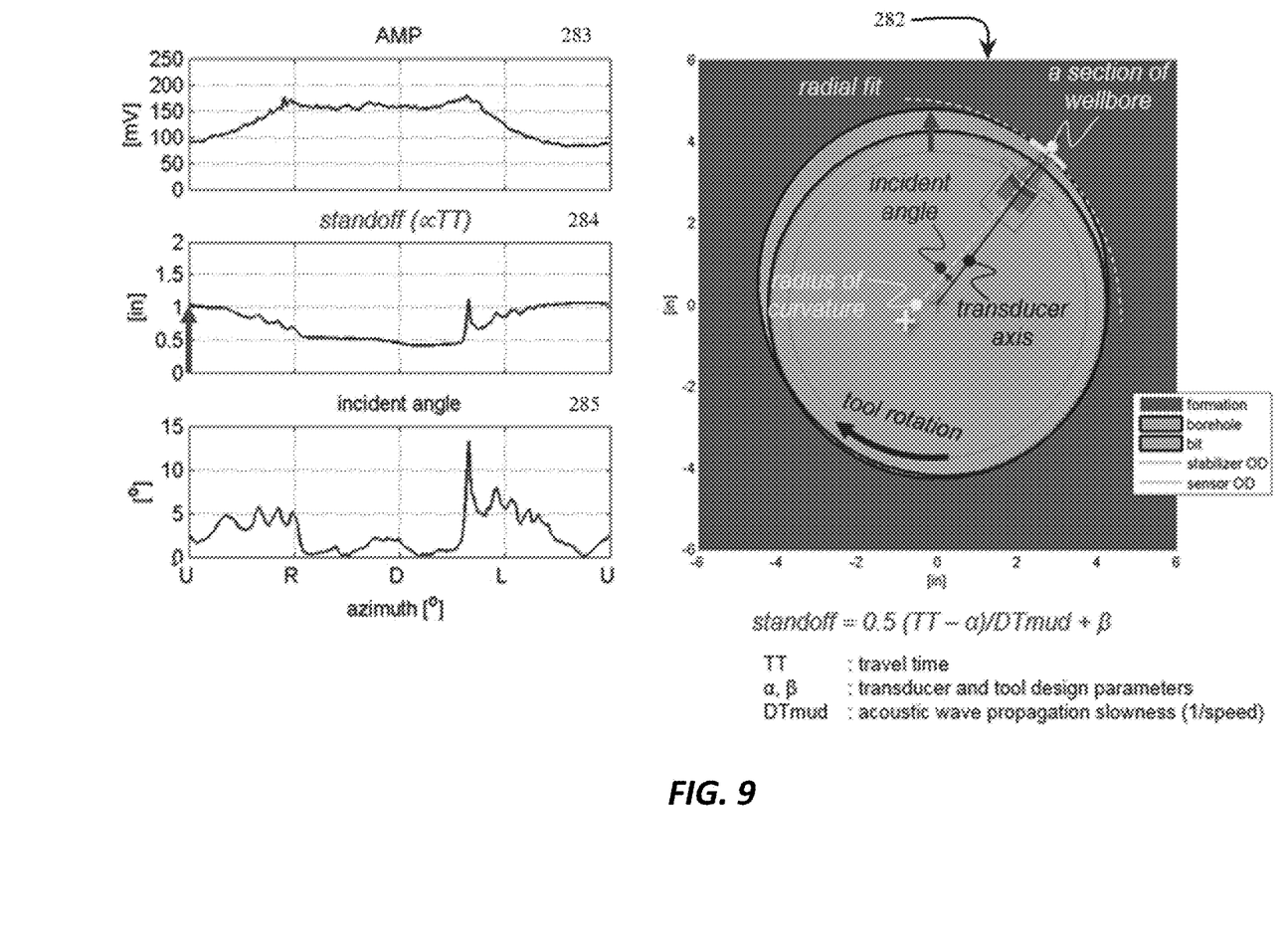
FIG. 9 is an illustration of at least a portion of an example of an ultrasonic pulse-echo measurement method using a downhole tool according to one or more aspects of the present disclosure.

As shown graphically in diagram 282 of FIG. 9, ultrasonic echo amplitude measurements can show effects of downhole tool eccentering, based on standoff and incident angle to wellbore surface, which can be estimated using travel time (TT). The incident angle is defined as the angle between the incident ray on the wellbore surface (corresponding to transducer axis) and the line passing by the tool center and the point of incidence of the incident ray at the wellbore surface, as shown in FIG. 9. The travel time may be correlated with standoff using ultrasonic (acoustic) wave propagation slowness (abbreviated as DTmud herein, which represents a reciprocal of speed), according to the equation shown below diagram 282 of FIG. 9. Diagrams 283, 284, 285 of FIG. 9 show eccentering effects during an example measurement from a downhole tool within a wellbore shown in diagram 282, such as effect on amplitude (diagram 283), on standoff (diagram 284), and on incident angle (diagram 285), each relative to azimuth.

When tool center motion in wellbore is negligibly small relative to tool eccentricity, standoff and incident angle can be computed using simple histogrammatic calculations. However, with more complex tool eccentering effects, methods of eccentering correction for echo amplitude based on standoff and incident angle may advantageously be employed. For example, direct measurements of, as well as apparatus for measuring, DTmud can be found in U.S. Patent Application Publication No. 2017/0115423, the contents of which are incorporated by reference herein. Also as an example, one or more of the pulse-echo transducers may comprise or be one or more of multiple transducers referenced in U.S. Patent Application Publication No. 2017/0115423. Alternatively, DTmud and wellbore geometry (standoff) can be inverted using model fitting calculations, e.g., as described in European Patent Application No. 2 757 391, the contents of which are incorporated by reference herein.

Additionally, when a data set including at least three data points has been acquired to probe standoff in a section of the wellbore, such as during collection of raw waveforms of echo signals in module or stage 210, the ultrasonic pulse-echo incident angle can be modeled by applying circular fitting parameters and methods to the standoff data set. Indeed, number of data points may be a parameter relevant to the module or stage of calculating eccentering impacts on pulse-echo amplitudes using geometric computation 220. In some cases, incidents of statistical outlier data, e.g., due to ultrasonic pulse detection error or the like, may be excluded, with estimates and/or extrapolations from neighboring data being substitutable therefor to enable smoother modeling.

Figure 10:
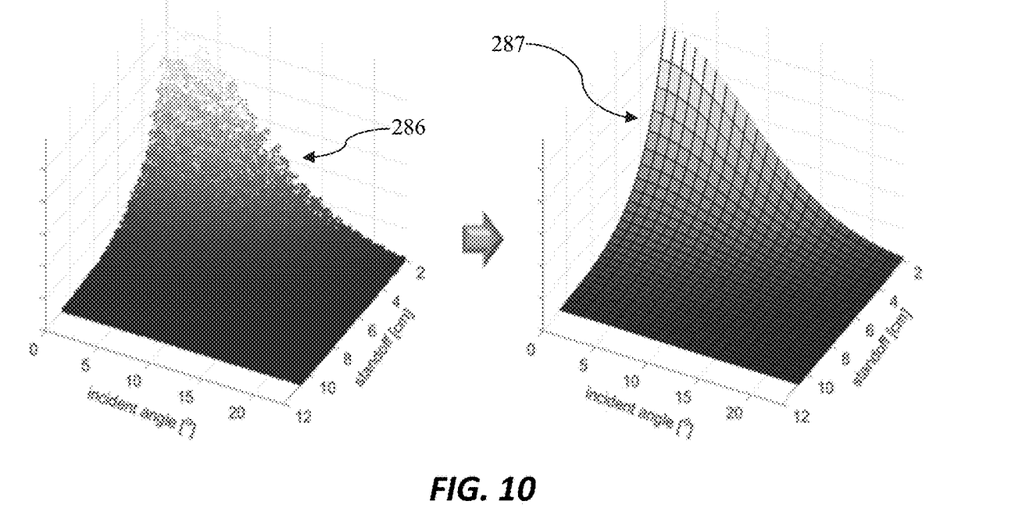
FIG. 10 is an illustration of at least a portion of an example of an ultrasonic pulse-echo measurement analysis method using a downhole tool according to one or more aspects of the present disclosure.
Figure 11:
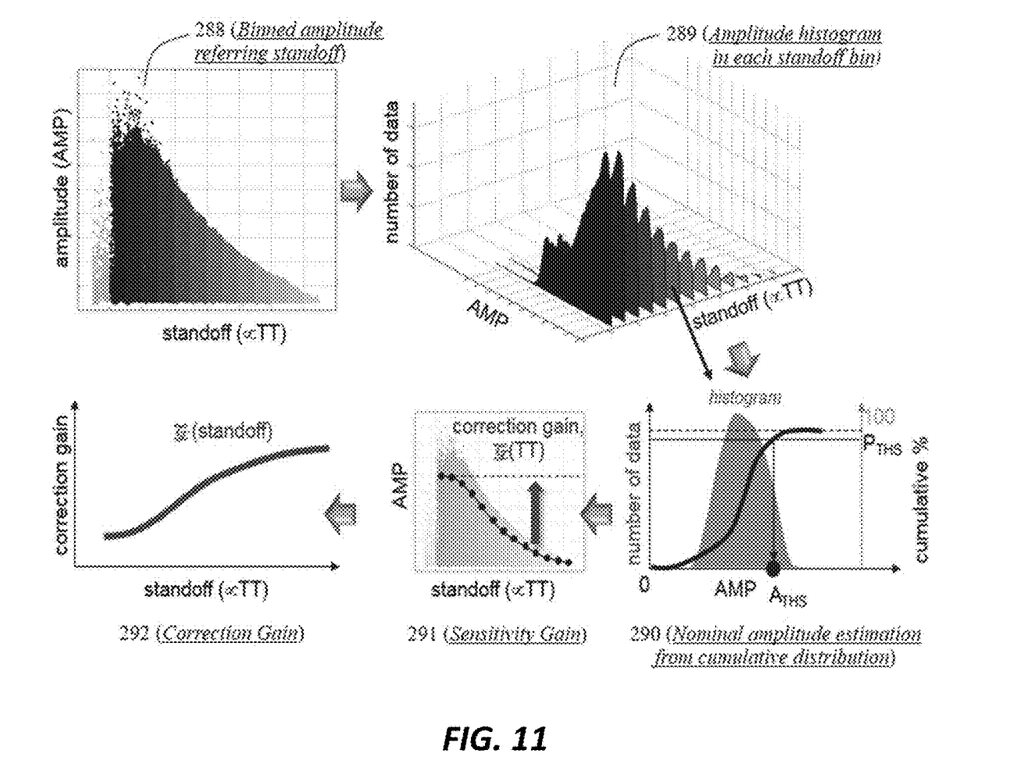
FIG. 11 is an illustration of at least a portion of an example of an ultrasonic pulse-echo measurement analysis method using a downhole tool according to one or more aspects of the present disclosure.

FIGS. 10 and 11 collectively illustrate an example of ultrasonic pulse-echo measurement analysis using a downhole tool according to the modules or stages of analyzing amplitude sensitivity to geometric and spatial characteristics 230 and computing gain correction across all echo (envelope) amplitudes 240, as shown in FIG. 5.

Each raw echo (envelope) amplitude can be cross-plotted against both standoff and incident angle, as shown in diagram 286 of FIG. 10. To analyze the sensitivity of echo (envelope) amplitude to variations in standoff and incident angle, the echo (envelope) amplitudes may be binned into standoff-incident angle categories based on their values, as shown in diagram 287 of FIG. 10. Amplitude data may be analyzed and processed statistically, with respect to these two geometric values.

Pulse-echo data can typically be acquired at relatively high speeds, particularly during downhole operations. In some cases, a million data points may be acquired within approximately 20 minutes. At drilling speeds of about 100 feet per hour (ft/hr) (about 30 meters per hour), that amount of data can be generated from measurements during tool penetration of about 33 ft (about 10 meters). With a data set that sizeable, pulse-echo data, if properly interpreted, can provide a wealth of information regarding different wellbore surface shapes/imperfections, subterranean formation features, drilling mud variations, and other wellbore and extra-wellbore conditions. Such large data sets may advantageously be processed using statistical methods to extract sensitivity of echo (envelope) amplitudes to standoff and incident angle.

FIG. 11 illustrates an example method of statistical amplitude sensitivity curve estimation at different standoff in five segments. For the analysis in FIG. 11 and/or for amplitude sensitivity analysis 230 and correction gain computation 240 in FIG. 5, standoff may be approximated or replaced by TT, based on their somewhat linear correlation. In segment/diagram 288, amplitude data is binned relative to standoff, as shown in FIG. 10. In segment/diagram 289, a histogram of amplitude data may be computed at each standoff bin. In segment/diagram 290, cumulative amplitude distribution can be computed for each histogram. Echo (envelope) amplitude, $A_{THS}$, which corresponds to a threshold bin probability, $P_{THS}$, may be used as the nominal amplitude at a given standoff. Standoff bin size and the $P_{THS}$ values can be varied as parameters of the module or stage of analyzing amplitude sensitivity to geometric and spatial characteristics 230.

In segment/diagram 291, the segment analysis from diagram 290 may be repeated for all standoff bins, resulting in a set or array of nominal amplitude values for each standoff. Additionally or alternatively, in cases where standoffs are approximately continuously varying, nominal amplitude values can be interpolated between two standoffs as an arbitrary estimate of nominal amplitudes value(s) therebetween. By making the nominal amplitude at the shortest standoff as a reference amplitude, the nominal amplitudes at larger standoffs can be compensated to indicate correction gains, as shown by the vertical arrow in the graphic representing the fourth segment of FIG. 11. In segment/diagram 292, standoff-dependent correction gain can be computed as the final portion of the module or stage of computing gain correction across all echo (envelope) amplitudes 240. By repeating this five-segment analysis at a variety of different incident angles, correction gain can be computed in a two-dimensional plane of standoff and incident angle. Alternatively to the example(s) presented herein, there may be other ways of computing statistical sensitivities and of estimating and applying a correction gain, using different mathematical approaches and yet still within the scope of the present disclosure.

Figure 12:
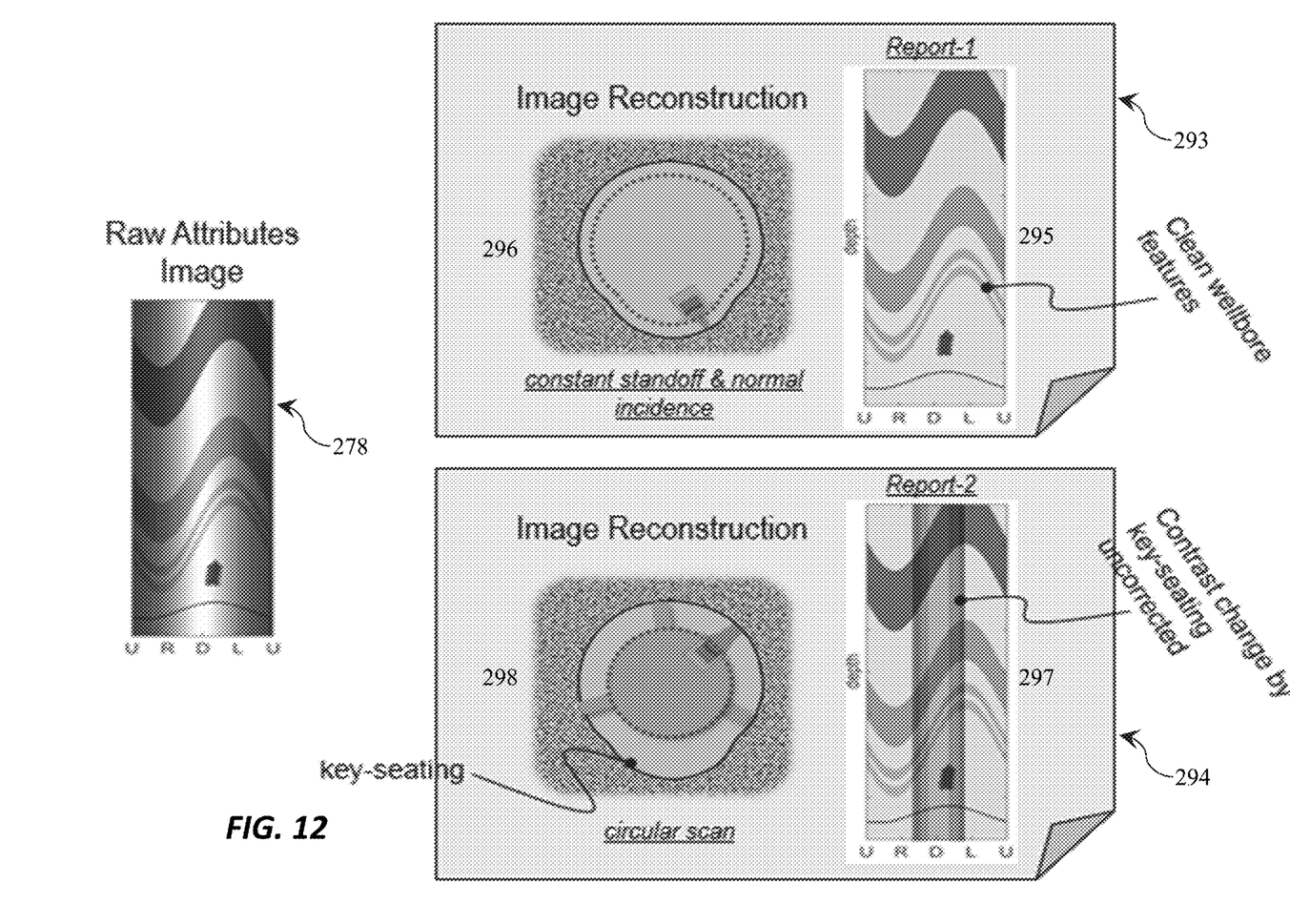
FIG. 12 is an illustration of visual outputs of at least a portion of an example implementation of a method according to one or more aspects of the present disclosure.

FIG. 12 shows an example illustration of two visual outputs 293, 294 from the module or stage of generating a visual representation of corrected pulse-echo results 250 from FIG. 5. The example illustration originates with an input pulse-echo data set represented visually by a two-dimensional azimuth image 278 of a wellbore section collected by an eccentered downhole tool, as shown in FIG. 8 and reproduced in FIG. 12. This image 278 represents raw echo (envelope) amplitude azimuths, uncorrected for standoff or incident angle. A method for correcting an ultrasonic pulse-echo amplitude image due to eccentering of a downhole tool, such as illustrated in FIGS. 10-11, may be used to calculate and apply an appropriate correction gain, e.g., based on relevant parameters that may be empirically gathered and/or that may be imposed by a user, in order to equalize wellbore surface contrast. FIG. 12 shows two different visual outputs (reports) 293, 294 generated from a similar wellbore—each output includes a corresponding two-dimensional azimuth image 295, 297, corrected for eccentering effects, and optionally also a corresponding image reconstruction of a cross-sectional slice of the wellbore 296, 298, based on their respective two-dimensional azimuth images 295, 297.

When analyzing geological formations/features transecting the wellbore, a user may prefer a relatively clean (relatively even background contrast) image that ignores or minimizes irregular wellbore shape, such as Report-1 in the output 293. The two-dimensional azimuth image 295 of Report-1 is corrected for eccentering effects due to standoff and incident angle and, as shown in the wellbore cross-sectional image reconstruction 296, may represent a situation in which measurement appears as if the transducer followed the contour of the wellbore surface at approximately constant standoff and normal incidence.

Despite appearances, Report-1 may additionally or alternatively represent a situation where wellbore surface shape irregularities (e.g., deviations from circular or oval cross-section) are simply taken into account as a portion of the eccentering correction method according to one or more aspects of the present disclosure. For example, formation layering and dipping angle, among other parameters, may be distorted when wellbore geometry deviates from circular cross-sectional shape. If wellbore cross-sectional geometry is known (or deduced from previous measurements), the position(s) of irregular features may be corrected and re-mapped to approximate circular wellbore cross-sectional projection. Such wellbore surface irregularity correction can be particularly useful when undertaking advanced geological formation/feature analysis and/or when precision is advisable. Standoff- and incident-angle-corrected image data may be useful in facilitating automated image data compression for real-time image transmission, e.g., after removing contrast/color changes as eccentering artifacts.

For evaluating drilling safety and/or wellbore stability, a user may prefer a relatively complete image that, while correcting for eccentering, retains information regarding wellbore surface geometric defects, which may appear as amplitude (contrast) change on a two-dimensional azimuth image, such as Report-2 in the output 294. Some users may feel that images deconvoluting wellbore irregularities from eccentering effects, such as the key-seating shown in the wellbore cross-sectional image reconstruction 298 of the azimuth image 297 in Report-2. This Report-2 output 294 may represent a situation in which measurement appears as if the transducer followed a circular path at approximately constant axial displacement (i.e., distance from the wellbore central axis), instead of following the contour of the wellbore surface at approximately constant standoff and normal incidence. For some users, the Report-2 format in output 294 can be more intuitive than curve or averaged caliper data that has been smoothed, as in Report-1 of output 293.

In addition to or instead of generating a visual report, the raw and/or corrected data, and indeed some or all of the measurement and correction of ultrasonic pulse-echo amplitude data for eccentering effects 205, may be stored in a database 260 and/or may be forwarded to a processing system, such as processing system 300, for automatic and/or user-initiated control of a downhole tool, such as the ultrasonic tool 20 of FIGS. 1-2 and/or the logging tool 265 of FIG. 5.

Figure 13:
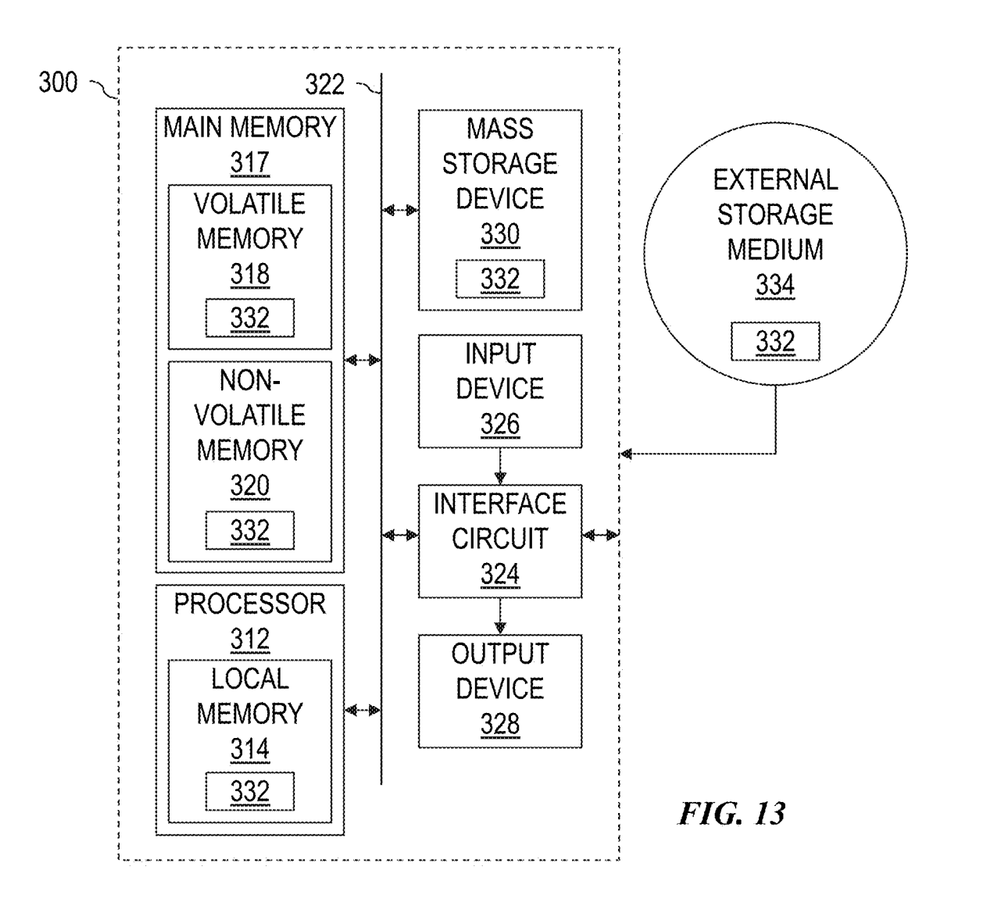
FIG. 13 is a schematic view of at least a portion of an example implementation of apparatus according to one or more aspects of the present disclosure.

FIG. 13 is a schematic view of at least a portion of an example implementation of a processing system 300. The processing system 300 may execute example machine-readable instructions to implement at least a portion of one or more of the methods and/or processes described herein, and/or to implement a portion of one or more of the example downhole tools described herein. The processing system 300 may be or comprise, e.g., one or more processors, controllers, special-purpose computing devices, servers, personal computers, personal digital assistant (PDA) devices, smartphones, internet appliances, and/or other types of computing devices. Moreover, while it is possible that the entirety of the processing system 300 shown in FIG. 13 may be implemented within downhole apparatus described above, such as the ultrasonic tool 20, one or more components or functions of the processing system 300 may also or instead be implemented in wellsite surface equipment, such as the surface instrumentation 7, and/or other surface or downhole equipment.

The processing system 300 may comprise a processor 312, such as a general-purpose programmable processor, for example. The processor 312 may comprise a local memory 314, and may execute program code instructions 332 present in the local memory 314 and/or another memory device. The processor 312 may execute, among other things, machine-readable instructions or programs to implement the methods and/or processes described herein. The programs stored in the local memory 314 may include program instructions or computer program code that, when executed by an associated processor, cause a controller and/or control system implemented in surface equipment and/or a downhole tool to perform tasks as described herein. The processor 312 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 312 may be in communication with a main memory 317, such as via a bus 322 and/or other communication means. The main memory 317 may comprise a volatile memory 318 and a non-volatile memory 320. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or the non-volatile memory 320.

The processing system 300 may also comprise an interface circuit 324. The interface circuit 324 may be, comprise, or be implemented by various types of standard interfaces, such as an Ethernet interface, a universal serial bus (USB), a third-generation input/output (3GIO) interface, a wireless interface, and/or a cellular interface, among other examples. The interface circuit 324 may also comprise a graphics driver card. The interface circuit 324 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 326 may be connected to the interface circuit 324. One or more of the input devices 326 may permit a user to enter data and/or commands for utilization by the processor 312. Each input device 326 may be, comprise, or be implemented by a keyboard, a mouse, a touchscreen, a track-pad, a trackball, an image/code scanner, and/or a voice recognition system, among other examples.

One or more output devices 328 may also be connected to the interface circuit 324. One or more of the output devices 328 may be, comprise, or be implemented by a display device, such as a liquid crystal display (LCD), a light-emitting diode (LED) display, a plasma display, and/or a cathode ray tube (CRT) display, among other examples. One or more of the output devices 328 may also or instead be, comprise, or be implemented by a printer, speaker, and/or other examples.

The processing system 300 may also comprise a mass storage device 330 for storing machine-readable instructions and data. The mass storage device 330 may be connected to the interface circuit 324, such as via the bus 322. The mass storage device 330 may be or comprise a floppy disk drive, a hard disk drive, a compact disk (CD) drive, flash drive, and/or digital versatile disk (DVD) drive, among other examples. Program code instructions 332 may be stored in the mass storage device 330, the volatile memory 318, the non-volatile memory 320, the local memory 314, and/or on a removable storage medium 334, such as a CD, DVD, or flash drive, for example.

The mass storage device 330, the volatile memory 318, the non-volatile memory 320, the local memory 314, and/or the removable storage medium 334 may each be a tangible, non-transitory storage medium. The modules and/or other components of the processing system 300 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces a method comprising: collecting data for a period of time by detecting a plurality of echoes from a plurality of ultrasonic pulses emitted by at least one transducer of a downhole tool toward a surface of a wellbore and through drilling mud contained within the wellbore. The detecting may occur while the downhole tool is also drilling within the wellbore, perhaps including while the downhole tool is eccentered by at least one centimeter within the wellbore during at least 10% of the time period. The method also includes: extracting variable information from the collected data, including at least echo envelope amplitude, azimuth, and location for each echo; assessing, utilizing the extracted variable information, sensitivity of the extracted echo envelope amplitudes to geometric and spatial characteristics of the wellbore and/or the downhole tool within the wellbore; correcting echo envelope amplitudes for eccentering effects based on the assessed sensitivity; and generating a visual representation of the corrected echo envelope amplitudes.

The geometric and spatial characteristics include a standoff between the transducer and the wellbore and an incident angle.

The extraction may be via calculation and/or interpolation.

The extracted variable information may comprise echo envelope shape, echo travel time and/or standoff, echo wave propagation slowness, and echo incident angle for each echo. In such implementations, among others within the scope of the present disclosure, the sensitivity assessment may comprise determining the eccentering effects via statistical analysis. The sensitivity assessment may comprise binning echo envelope amplitudes based on each echo travel time and/or standoff and each echo incident angle. The sensitivity assessment may comprise: compiling a histogram of echo envelope amplitude data at each incident angle bin; determining cumulative echo envelope amplitude distribution for each histogram; determining a set of nominal echo envelope amplitudes for each incident angle corresponding to each echo envelope amplitude; and determining an incident angle-dependent correction gain for each echo envelope amplitude. The extracted variable information may further comprise bin size, threshold bin probability $P_{THS}$, or both.

Correcting echo envelope amplitudes for eccentering effects may include correcting echo envelope amplitudes for wellbore shape irregularities.

Correcting echo envelope amplitudes for eccentering effects may specifically retain echo envelope amplitude effects due to wellbore shape irregularities. In such implementations, among others within the scope of the present disclosure, echo envelope amplitude effects due to wellbore shape irregularities may appear on the visual representation as amplitude contrast anomalies.

The visual representation of corrected amplitudes may comprise a 2D image that maps the corrected echo envelope amplitudes based on azimuth and location for an entire analyzed portion of the wellbore or for a portion of an analyzed portion of the wellbore. The 2D image may be a first 2D image, and the visual representation may further comprise a second 2D image that maps raw, uncorrected echo envelope amplitudes based on azimuth and location for the entire analyzed portion of the wellbore shown in the first 2D image or for the portion of the analyzed portion of the wellbore shown in the first 2D image.

The present disclosure also introduces a system comprising a downhole tool comprising an ultrasonic portion comprising: at least one transducer configured to emit a plurality of ultrasonic pulses toward a surface of a wellbore, including through drilling mud contained within the wellbore; and at least one detector configured to detect a plurality of ultrasonic pulse echoes corresponding to the plurality of ultrasonic pulses. The downhole tool may also comprise a drilling portion configured to drill within the wellbore at the same time as the ultrasonic portion is emitting and detecting. The system also comprises a processing device comprising a processor and a memory for storing an executable code, wherein the processing device is operable to: (1) store and/or process data collected for a period of time by detecting the plurality of echoes from the plurality of ultrasonic pulses emitted by the downhole tool (perhaps while the downhole tool is also drilling within the wellbore, and perhaps while the ultrasonic portion of the downhole tool is eccentered by at least one centimeter within the wellbore during at least 10% of the time period); (2) extract select variable information related to the detected echoes, including at least echo envelope amplitude, azimuth, and location corresponding to each detected echo; (3) assess, based on the extracted select variable information, echo envelope amplitude sensitivity to geometric and spatial characteristics of the downhole tool within the wellbore, wherein the geometric and spatial characteristics include a standoff between the transducer and the wellbore and an incident angle; (4) correct the echo envelope amplitudes for eccentering effects based on the sensitivity assessment; and (5) generate a visual representation of corrected echo envelope amplitudes.

The ultrasonic portion of the downhole tool may comprise one or more pairs of transducers, and the transducers of each pair may be oriented to emit ultrasonic pulses in opposite, radially-outward directions.

The present disclosure also introduces a tangible, non-transient, computer-readable medium (TNTCRM) comprising instructions executable by a processor to: store and/or process data collected for a period of time by detecting a plurality of echoes from a plurality of ultrasonic pulses emitted by at least one transducer of a downhole tool toward a surface of a wellbore, including through drilling mud contained within the wellbore (the detecting may occur while the downhole tool is also drilling within the wellbore, including while the downhole tool is eccentered by at least one centimeter within the wellbore during at least 10% of the time period); extract select variable information related to the plurality of echoes, including at least envelope amplitude, azimuth, and location corresponding to each detected echo; utilize the extracted select variable information to assess echo envelope amplitude sensitivity to geometric and spatial characteristics of the downhole tool within the wellbore, wherein the geometric and spatial characteristics include a standoff between the transducer and the wellbore and an incident angle; correct echo envelope amplitudes for eccentering effects based on the sensitivity assessment; and generate a visual representation of corrected echo envelope amplitudes.

The extracted variable information may comprise each echo envelope shape, each echo travel time and/or standoff, each echo wave propagation slowness, each echo incident angle, number of echoes collected, or combinations thereof. The sensitivity assessment may comprise: (i) determining the eccentering effects via statistical analysis; (ii) binning echo envelope amplitudes based on each echo travel time and/or standoff and each echo incident angle; or both (i) and (ii). The sensitivity assessment may comprise: compiling a histogram of echo envelope amplitude data at each incident angle bin; determining cumulative echo envelope amplitude distribution for each histogram; determining a set of nominal echo envelope amplitudes for each incident angle corresponding to each echo envelope amplitude; and determining an incident angle-dependent correction gain for each echo envelope amplitude. The select variable information relating to each echo may further comprise bin size, threshold bin probability $P_{THS}$, or both.

Correcting echo envelope amplitudes for eccentering effects may include correcting echo envelope amplitudes for wellbore shape irregularities.

Correcting echo envelope amplitudes for eccentering effects may specifically retain echo envelope amplitude effects due to wellbore shape irregularities.

Echo envelope amplitude effects due to wellbore shape irregularities may appear on the visual representation as amplitude contrast anomalies.

The visual representation of corrected amplitudes may comprise a 2D image that maps corrected echo envelope amplitudes based on azimuth and location for an entire analyzed portion of the wellbore or for a portion of an analyzed portion of the wellbore. The 2D image may be a first 2D image, and the visual representation may further comprise a second 2D image that maps raw, uncorrected echo envelope amplitudes based on azimuth and location for the entire analyzed portion of the wellbore shown in the first 2D image or for the portion of the analyzed portion of the wellbore shown in the first 2D image.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
    collecting data for a period of time by detecting a plurality of echoes from a plurality of ultrasonic pulses emitted by at least one transducer of a downhole tool toward a surface of a wellbore and through drilling mud contained within the wellbore;
    extracting variable information from the collected data, including at least echo envelope amplitude, azimuth, and location for each echo;
    assessing, utilizing the extracted variable information, sensitivity of the extracted echo envelope amplitudes to geometric and spatial characteristics of the downhole tool within the wellbore, wherein the geometric and spatial characteristics include at least a standoff between the transducer and the wellbore and an incident angle;
    correcting echo envelope amplitudes for eccentering effects based on the assessed sensitivity; and
    generating a visual representation of the corrected echo envelope amplitudes.

2. The method of claim 1 wherein the extracted variable information comprises echo envelope shape, echo travel time and/or standoff, echo wave propagation slowness, and echo incident angle for each echo.

3. The method of claim 2 wherein the sensitivity assessment comprises:
    (i) determining the eccentering effects via statistical analysis;
    (ii) binning echo envelope amplitudes based on each echo travel time and/or standoff and each echo incident angle; or
    both (i) and (ii).

4. The method of claim 3 wherein the sensitivity assessment further comprises:
    compiling a histogram of echo envelope amplitude data at each standoff bin;
    determining cumulative echo envelope amplitude distribution for each histogram;
    determining a set of nominal echo envelope amplitudes for each standoff corresponding to each echo envelope amplitude; and determining a standoff-dependent correction gain for each echo envelope amplitude.

5. The method of claim 3 wherein the sensitivity assessment further comprises:
compiling a histogram of each envelope amplitude data at each incident angle bin;
determining cumulative echo envelope amplitude distribution for each histogram;
determining a set of nominal echo envelope amplitudes for each incident angle corresponding to each echo envelope amplitude; and
determining an incident angle-dependent correction gain for each echo envelope amplitude.

6. The method of claim 1 wherein correcting echo envelope amplitudes for eccentering effects specifically retains echo envelope amplitude effects due to wellbore shape irregularities, and wherein echo envelope amplitude effects due to wellbore shape irregularities appear on the visual representation as amplitude contrast anomalies.

7. The method of claim 1 wherein the visual representation of corrected amplitudes comprises a two-dimensional (2D) image that maps the corrected echo envelope amplitudes based on azimuth and location for an entire analyzed portion of the wellbore or for a portion of an analyzed portion of the wellbore.

8. The method of claim 1, wherein detecting the plurality of echoes occurs while the downhole tool is also drilling within the wellbore, and the downhole tool is eccentered by at least one centimeter within the wellbore during at least 10% of the time period.

9. A system comprising:
a downhole tool comprising:
an ultrasonic portion comprising:
at least one transducer configured to emit a plurality of ultrasonic pulses toward a surface of a wellbore, including through drilling mud contained within the wellbore; and
at least one detector configured to detect a plurality of ultrasonic pulse echoes corresponding to the plurality of ultrasonic pulses; and
a processing device comprising a processor and a memory for storing an executable code, wherein the processing device is operable to:
store and/or process data collected for a period of time by detecting the plurality of echoes from the plurality of ultrasonic pulses emitted by the downhole tool;
extract select variable information related to the detected echoes, including at least echo envelope amplitude, azimuth, and location corresponding to each detected echo;
assess, based on the extracted select variable information, echo envelope amplitude sensitivity to geometric and spatial characteristics of the downhole tool within the wellbore, wherein the geometric and spatial characteristics include at least a standoff between the transducer and the wellbore and an incident angle;
correct the echo envelope amplitudes for eccentering effects based on the sensitivity assessment; and
generate a visual representation of corrected echo envelope amplitudes.

10. The system of claim 9 wherein the ultrasonic portion of the downhole tool comprises one or more pairs of transducers, and wherein the transducers of each pair are oriented to emit ultrasonic pulses in opposite, radially-outward directions.

11. The system of claim 9, wherein the downhole tool is a LWD tool that is eccentered by at least one centimeter within the wellbore during at least 10% of the time period.

12. A tangible, non-transient, computer-readable medium (TNTCRM) comprising instructions executable by a processor to:
store and/or process data collected for a period of time by detecting a plurality of echoes from a plurality of ultrasonic pulses emitted by at least one transducer of a downhole tool toward a surface of a wellbore, including through drilling mud contained within the wellbore;
extract select variable information related to the plurality of echoes, including at least envelope amplitude, azimuth, and location corresponding to each detected echo;
utilize the extracted select variable information to assess echo envelope amplitude sensitivity to geometric and spatial characteristics of the downhole tool within the wellbore, wherein the geometric and spatial characteristics include at least a standoff between the transducer and the wellbore and an incident angle;
correct echo envelope amplitudes for eccentering effects based on the sensitivity assessment; and
generate a visual representation of corrected echo envelope amplitudes.

13. The TNTCRM of claim 12 wherein the extracted variable information comprises each echo envelope shape, each echo travel time and/or standoff, each echo wave propagation slowness, each echo incident angle, number of echoes collected, or combinations thereof.

14. The TNTCRM of claim 12 wherein the sensitivity assessment comprises:
(i) determining the eccentering effects via statistical analysis;
(ii) binning echo envelope amplitudes based on each echo travel time and/or standoff and each echo incident angle; or
both (i) and (ii).

15. The TNTCRM of claim 12 wherein the sensitivity assessment further comprises:
compiling a histogram of each envelope amplitude data at each incident angle bin;
determining cumulative echo envelope amplitude distribution for each histogram;
determining a set of nominal echo envelope amplitudes for each incident angle corresponding to each echo envelope amplitude; and
determining an incident angle-dependent correction gain for each echo envelope amplitude.

16. The TNTCRM of claim 12 wherein the sensitivity assessment further comprises:
compiling a histogram of echo envelope amplitude data at each standoff bin;
determining cumulative echo envelope amplitude distribution for each histogram;
determining a set of nominal echo envelope amplitudes for each standoff corresponding to each echo envelope amplitude; and
determining a standoff-dependent correction gain for each echo envelope amplitude.

17. The TNTCRM of claim 12 wherein correcting echo envelope amplitudes for eccentering effects specifically retains echo envelope amplitude effects due to wellbore shape irregularities, and wherein echo envelope amplitude effects due to wellbore shape irregularities appear on the visual representation as amplitude contrast anomalies.

18. The TNTCRM of claim 12 wherein the visual representation of corrected amplitudes comprises a two-dimensional (2D) image that maps the corrected echo envelope amplitudes based on azimuth and location for an entire analyzed portion of the wellbore or for a portion of an analyzed portion of the wellbore.

19. The TNTCRM of claim 12, wherein detecting the plurality of echoes occurs while the downhole tool is also drilling within the wellbore, and the downhole tool is eccentered by at least one centimeter within the wellbore during at least 10% of the time period.

* * * * *